US007880882B2

(12) United States Patent
Jayaraman et al.

(10) Patent No.: US 7,880,882 B2
(45) Date of Patent: Feb. 1, 2011

(54) MULTI-WAVELENGTH LIGHT SOURCE FOR SPECTROSCOPY

(75) Inventors: Vijaysekhar Jayaraman, Goleta, CA (US); Timothy Andrew Strand, Santa Barbara, CA (US); Devin Blaine Leonard, Santa Barbara, CA (US)

(73) Assignee: Praevium Research, Inc., Santa Barbara, CA (US)

( * ) Notice: Subject to any disclaimer, the term of this patent is extended or adjusted under 35 U.S.C. 154(b) by 219 days.

(21) Appl. No.: 12/157,142

(22) Filed: Jun. 6, 2008

(65) Prior Publication Data

US 2009/0303475 A1 Dec. 10, 2009

Related U.S. Application Data

(60) Provisional application No. 60/933,547, filed on Jun. 7, 2007.

(51) Int. Cl.
*G01N 21/25* (2006.01)
(52) U.S. Cl. .................................................. 356/420
(58) Field of Classification Search ........................ None
See application file for complete search history.

(56) References Cited

U.S. PATENT DOCUMENTS

2004/0146257 A1* 7/2004 Parker et al. ................ 385/123

2008/0128627 A1* 6/2008 Lundquist et al. ...... 250/363.01

OTHER PUBLICATIONS

Mason, "Directly Modulated Sampled Grating DBR Lasers for Long-Haul WDM Communications Systems," Photonics Technology Letters, vol. 9, No. 3, Mar. 1997, p. 377-379.

* cited by examiner

*Primary Examiner*—Tu T Nguyen

(57) ABSTRACT

The invention discloses a system for optical spectroscopy comprising a multi-wavelength semiconductor light source comprising a plurality of semiconductor light sources disposed on a silicon sub-carrier and emitting a plurality of radiation components spanning a wavelength range. The radiation components are coupled to a waveguide array disposed on the same silicon subcarrier. Output from the waveguide array provides a compact multi-wavelength laser source with wide tuning range via a plurality of laser sources. The system further comprises means for directing radiation components to a sample, and an optical detector configured to detect one of a radiation reflected from and transmitted through said sample. The system can be used in a variety of applications including the analysis of in-vivo human tissue, agricultural samples, and pharmaceutical samples. Typical wavelength ranges are 650-1000 nm, 700-1700 nm, and 1100-2500 nm.

20 Claims, 6 Drawing Sheets

MULTI-WAVELENGTH LIGHT SOURCE FOR SPECTROSCOPY

RELATED APPLICATIONS

This application claims priority to US Provisional Application, Ser. No. 60/933,547 filed on Jun. 7, 2007

STATEMENT REGARDING FEDERALLY SPONSORED RESEARCH OR DEVELOPMENT

This invention was made under U.S. government grant R44CA101077. The U.S. government has certain rights in this invention.

BACKGROUND

1. Field of the Invention

This invention relates generally to semiconductor light sources, spectroscopy, polymer waveguides and multi-wavelength laser arrays.

2. Description of Prior Art

Spectroscopy refers to the use of multi-wavelength radiation to non-invasively probe a variety of samples to determine the composition, health, or function of those samples. Prior-art spectroscopy is done with filtered white light sources, as illustrated in the prior art FIG. 1. Here, a white light source 100 emits a broadband radiation 130, which is filtered with a tunable monochromator 110, comprising a rotating grating 114 and slit 118, to generate a narrowband radiation 150, which probes a sample 120. A diffuse reflected radiation 160 is then detected by an optical detector 140. By tuning the monochromator 110, it is possible to construct a spectrum of the reflected radiation 160, which provides non-invasive information about the sample 120.

Although it enables spectral measurements over a wide wavelength range, the prior-art white light spectrometer of FIG. 1 suffers from a number of limitations. First, the filtered white light source has weak signal to noise ratio. Second, the grating-based system has critical intra-system mechanical alignments, and contains moving parts, leading to a bulky and complex system with slow measurement times. Lastly, some applications, such as (B. Tromberg, N. Shah, R. Lanning, A. Cerussi, J. Espinoza, T. Pham, L. Svaasand, and J. Butler, "Non-Invasive In Vivo Characterization of Breast Tumors Using Photon Migration Spectroscopy," *Neoplasia*, vol. 2, nos. 1-2, January-April 2000, pp. 26-40) employ frequency domain measurements, which are not presently possible with white light sources, since white light sources cannot be easily modulated at the required 100 Mhz to 3 Ghz rates.

One solution to these problems is to replace the white-light source with a tunable laser. This eliminates the rotating grating 114, since the laser provides a source of tunable narrowband radiation which requires no further filtering. However, prior art tunable semiconductor lasers, such as those described in (B. Mason, S. Lee, M. E. Heimbuch, and L. A. Coldren, "Directly Modulated Sampled Grating DBR Lasers for Long-Haul WDM Communication Systems," *IEEE Photonics Technology Letters*, vol. 9, no. 5, March 1997, pp. 377-379), are limited in tuning range to less than 100 nanometers (nm), because of the fundamental gain-bandwidth limit of semiconductors. Most spectroscopic applications, such as near infrared spectroscopy from 1100-2500 nm, agricultural spectroscopy from 700-1700 nm, or tissue spectroscopy from 650-1000 nm, require several hundred nm bandwidth.

Telecom systems typically employ single-mode fibers, so tunable optical sources for telecom must be designed such that all wavelengths emerge from a common spatial location, and can be easily coupled into the single-mode fiber. In contrast, many systems employing diffuse optical spectroscopy can operate with a tunable source in which various wavelengths emerge from different spatial locations. Another way of stating this is that diffuse optical spectroscopy can use multi-mode sources, or sources emerging from multi-mode fiber. This is true if the sample undergoing spectrum analysis is spatially uniform over a distance larger than the spatial separation of sources, or if scattering within the sample causes the entrant light to spread out spatially over a distance larger than the source separation. Thus, construction of tunable sources for spectroscopy can employ designs that would not be appropriate for single-mode telecom sources. These same designs, however, could also be used in multi-mode communication systems.

Other prior art researchers, such as those in (B. Tromberg, N. Shah, R. Lanning, A. Cerussi, J. Espinoza, T. Pham, L. Svaasand, and J. Butler, "Non-Invasive In Vivo Characterization of Breast Tumors Using Photon Migration Spectroscopy," *Neoplasia*, vol. 2, nos. 1-2, January-April 2000, pp. 26-40), have assembled multiple discrete lasers to access wavelengths outside the gain bandwidth limitation of a single semiconductor laser. Such an approach employing separately packaged lasers, however, introduces complexity and cost while suffering from sparse and insufficient wavelength coverage. This leads to a bulky and complex system, typically involving complex optical coupling components or multiple optical fibers.

Therefore, what is needed in the art is a compact multi-wavelength light source for spectroscopic characterization of a sample providing wide tuning range via a plurality of light sources, whose output spans a spatial dimension sufficiently small to enable diffuse reflectance or transmittance spectroscopy of a sample. This system can be used in a variety of spectroscopy applications.

SUMMARY OF THE INVENTION

The present invention provides a plurality of semiconductor light sources coupled to a waveguide array, where both the light sources and waveguide array are disposed on a common silicon sub-carrier. An output side of the waveguide array is substantially smaller in spatial span than an input side of the waveguide array. The light sources can be arranged side by side in a linear fashion, where the coupled waveguides converge toward an output that is sufficiently small to enable coupling either to a multi mode optical fiber, or direct coupling to the sample. In another design, the light sources can be arranged around the perimeter of a circle where the coupled waveguides converge inward to a smaller concentric circle and direct the radiation to a reflector which then directs the radiation in a plane substantially perpendicular to its original plane for application to the sample (with or without the use of an optical fiber). This circular embodiment enables more light sources to be coupled into a small area.

Many types of semiconductor light sources could be used, including blue Gallium Nitride lasers, Fabry-Perot lasers or quantum cascade mid-infrared and far-infrared lasers. In addition to semiconductor lasers, light emitting diodes (LEDs) and SLEDs (Superluminescent LEDs) which are compact, efficient and reliable, can be used as light sources. Broader wavelength tuning can be achieved in the present invention by temperature control using a thermo-electric cooler or by using resistive heaters integrated with each light source. By electrically selecting one source at a time and one temperature, the multi-wavelength source functions as a tunable laser for spectroscopy. For example, in the desired wavelength range of 650-1000 nm, Fabry-Perot semiconductor lasers can, in conjunction with thermal tuning, provide complete wavelength coverage within the desired range. An important application for this wavelength range is broadband diffuse optical spectroscopy for detection of water, lipids, oxy-hemoglobin, and deoxy-hemoglobin, in the detection, characterization, and therapeutic monitoring of breast cancer. Frequency domain measurements of diffuse tissue reflectance can also be accomplished by applying a modulated drive current to each of the light sources in the current application.

The present invention uses native grown silicon dioxide as the lower cladding layer of the waveguide array, and a core layer with a refractive index higher than a refractive index of silicon dioxide. The core layer is preferably the commercially available spin-on epoxy resin known as SU-8.

A further understanding of the nature and advantages of the present invention may be realized by reference to the remaining portions of the specifications and drawings.

REFERENCE NUMERALS IN DRAWINGS

Figure 1:
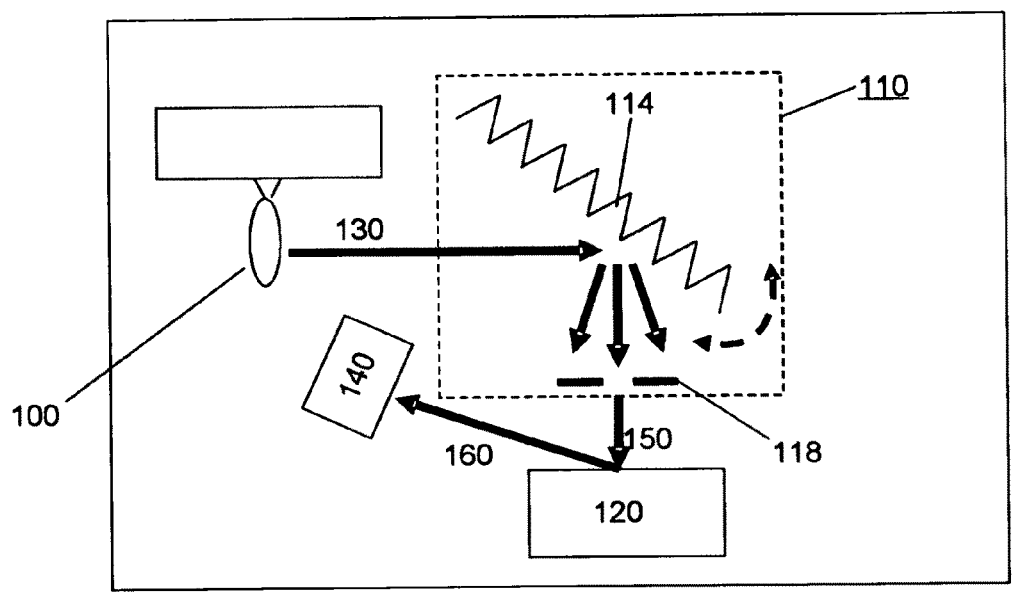
FIG. 1 is a schematic representation of a prior art grating-based spectrometer.

100 White light source
110 Tunable monochromator
114 Grating in prior art spectrometer
118 Slit in prior art spectrometer
120 Sample in prior art spectrometer
130 Broadband radiation emitted by white light source
140 Optical detector in prior art spectrometer
150 Narrow band radiation in prior art spectrometer
160 Diffuse reflectance from sample in prior art spectrometer
200 Plurality of semiconductor light sources according to present invention
205 Device region within the semiconductor light source 200
210 Common sub-carrier for light sources and waveguide array
215 Waveguide material according to the present invention
220 Waveguide array according to one embodiment of the present invention
225 Plurality of waveguides according to another preferred embodiment of the present invention
230 Spatial transverse extent at the input side of the linear waveguide array according to one embodiment of the present invention
235 Interfacial metal in present invention.
237 Perimeter of the interior circle formed by the semiconductor light sources 200 according to one embodiment of the present invention
240 Transverse extent at the output side of the waveguide array according to one embodiment of the present invention
245 Perimeter of the circle formed by the output side of the waveguide array 225 according to one embodiment of the present invention
250 Multi-mode optical fiber
260 Silicon dioxide layer
270 Cone shaped reflector
280 Radiation emitted from the waveguides and reflected toward the sample
300 First step in fabricating the multi-wavelength source according to the present invention
310 Second step in fabricating the multi-wavelength source according to the present invention
320 Third step in fabricating the multi-wavelength source according to the present invention
330 Fourth step in fabricating the multi-wavelength source according to present invention.
340 Final step in fabricating the multi-wavelength source according to present invention.

DETAILED DESCRIPTION OF THE INVENTION

In the following description of the preferred embodiments, reference is made to the accompanying drawings which form a part hereof, and in which is shown by way of illustration a specific embodiment in which the invention may be practiced. It is to be understood that other embodiments may be utilized and structural changes may be made without departing from the spirit and scope of the present invention.

FIGS. 2-5 represent top and cross-sectional views of two preferred embodiments of the present invention which schematically illustrate a plurality of semiconductor light sources coupled to a waveguide array, where both the light sources and waveguide array are disposed on a common silicon sub-carrier. In both embodiments, the output of the waveguide array is substantially smaller in spatial span than the input side of the waveguide.

Figure 2:
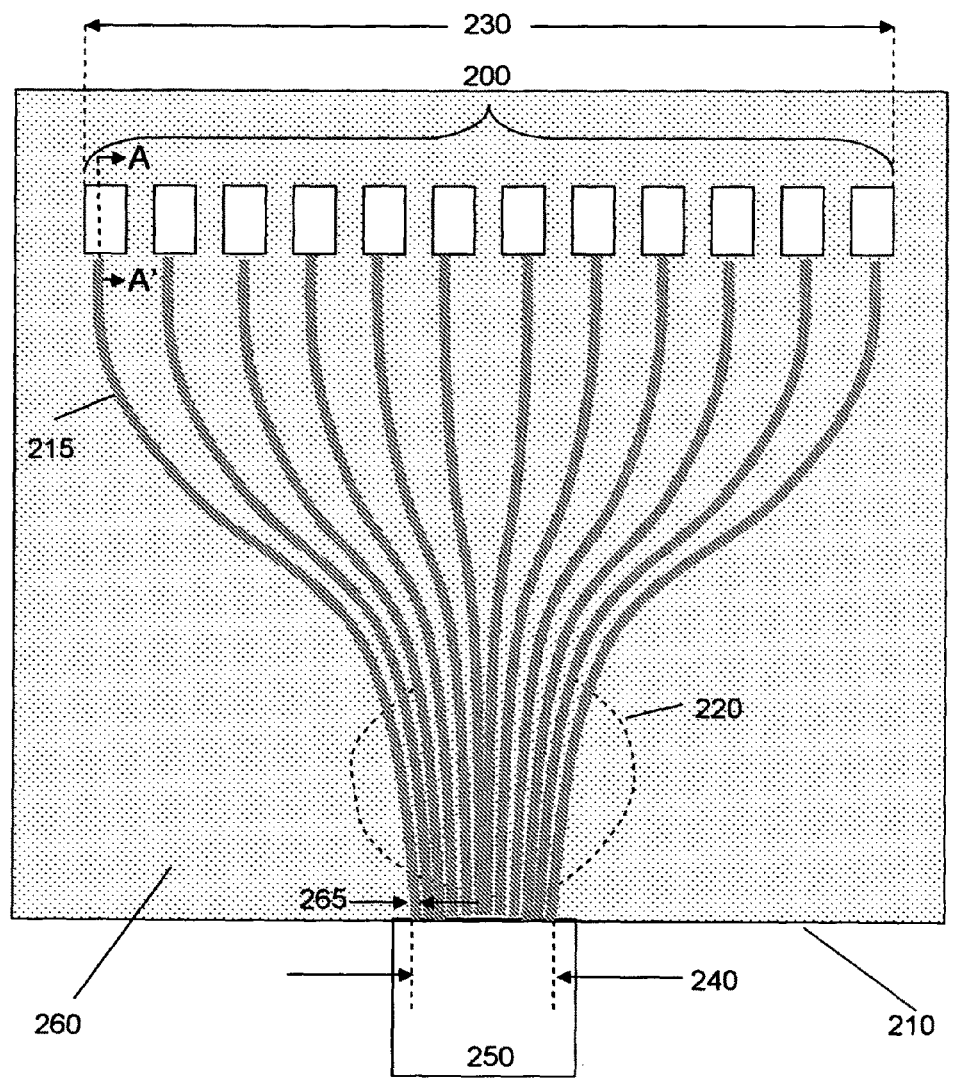
FIG. 2 is a top view schematic representation of a linear light source and waveguide array, coupled to an optical fiber.

Referring to FIG. 2, a plurality of semiconductor light sources 200 emitting a plurality of radiation components are arranged in a linear array and coupled to a waveguide array 220, comprising patterned core layers 215. Both waveguide array and light sources are disposed on a common silicon sub-carrier 210 largely coated with a native silicon dioxide layer 260. The waveguide array has an input spatial span 230, where radiation components from the light sources 200 are coupled into the array 220. The waveguides fan in to an output spatial span 240, which is smaller than the input spatial span 230. The output is typically coupled to a multi-mode optical fiber 250, but can also be delivered to a sample directly with no fiber. Example dimensions are 6 mm input spatial span 230 for a 12-channel waveguide array, and 300 microns for the output spatial span 240, for coupling to a fiber 250 with 400 micron core diameter. The waveguide array is preferably formed by lithographic patterning of the waveguide core layer, but an alternate and non-preferred method is mechanical stamping of the waveguide core layer.

Figure 3:
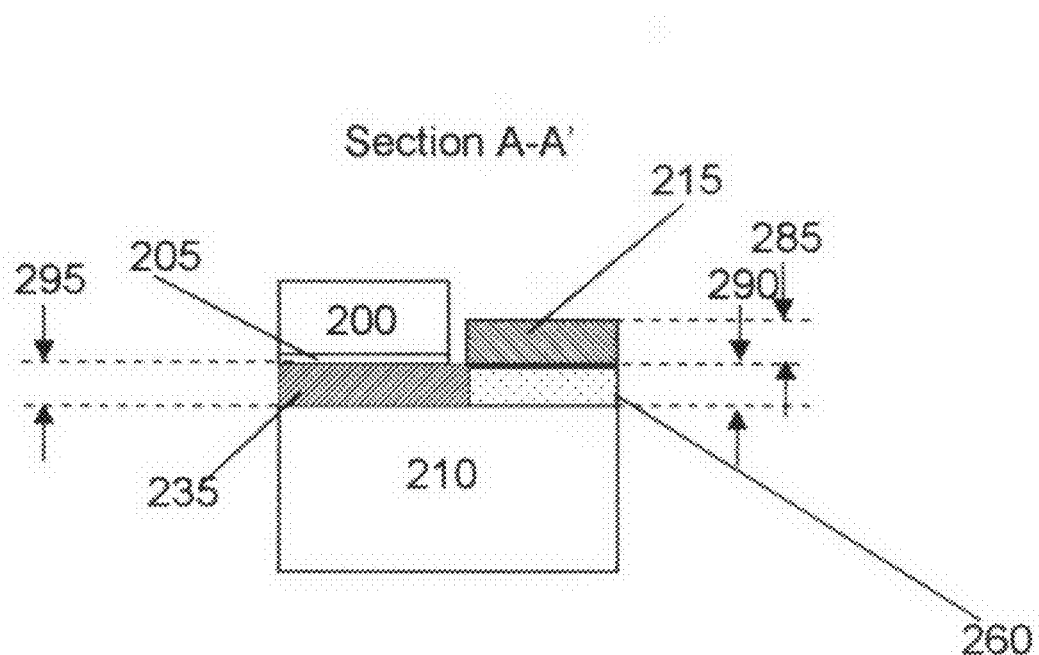
FIG. 3 is a small cross-section view of FIG. 2 showing a sub-carrier, cladding layer, semiconductor light source and waveguide core material.

The inset A-A' shown in FIG. 3 illustrates a cross-section of the waveguide-device junction, showing how the devices 200 are mounted to the silicon sub-carrier 210 by an interfacial metal 235, through openings in the silicon dioxide 260. This enables good heat-sinking, which would be prevented by the presence of the thermally insulating silicon dioxide layer 260 under the devices. The devices 200 are mounted with device side down, so that a device region 205 is adjacent the interfacial metal 235. This interfacial metal is preferably a low-temperature solder such as Indium or Gold-Tin, but could also be gold. The cross-section also illustrates native silicon dioxide layer 260 which coats the silicon sub-carrier 210 and deposited waveguide core layer 215, which is preferably the commercially available photo-sensitive spin-on epoxy resin SU-8, which can be directly patterned lithographically with no additional resist layers. By "deposited" core layer, we refer to any extrinsic material that is not thermally grown, in contrast to silicon dioxide which is a native thermally grown oxide on silicon. The deposition method is preferably spin-coating, as in the case of the preferred core SU-8, but other deposition methods include electron beam evaporation and sputter coating for alternate but not preferred materials. The silicon dioxide layer forms the lower cladding of the waveguide, while air is the upper cladding. The core layer 215 has a refractive index higher than a refractive index of the silicon dioxide layer 260. In alternate embodiments, a spin-on glass can encapsulate the core layer 215 to form a top cladding layer that has lower index than the core, but higher than air, and protects the waveguide from contaminants or particulates. A typical thickness 285 of the core layer 215 is 10-25 microns, to allow simultaneous ease of coupling and lithographic processing. A typical thickness 290 of the lower cladding 260 is 1-2 microns, to allow ease of etching and metallization prior to mounting devices, and sufficient thickness to prevent substantial penetration of guided radiation to the optically lossy silicon sub-carrier. A thickness 295 of the interfacial metal 235 is slightly greater than the thickness 290, to enable efficient coupling of radiation from light sources 200 to the waveguide core 215.

A typical width 265 of the waveguide core at the output end, illustrated in FIG. 2, is a in the range of about 10 to about 50 microns, depending on the output spatial span required. Wider cores lead to less propagation loss due to sidewall scattering. The wave guide width is also typically tapered from a larger value at the input end near the devices 200, to a smaller value at the output end, enabling relaxed alignment tolerances at the input end.

Figure 4:
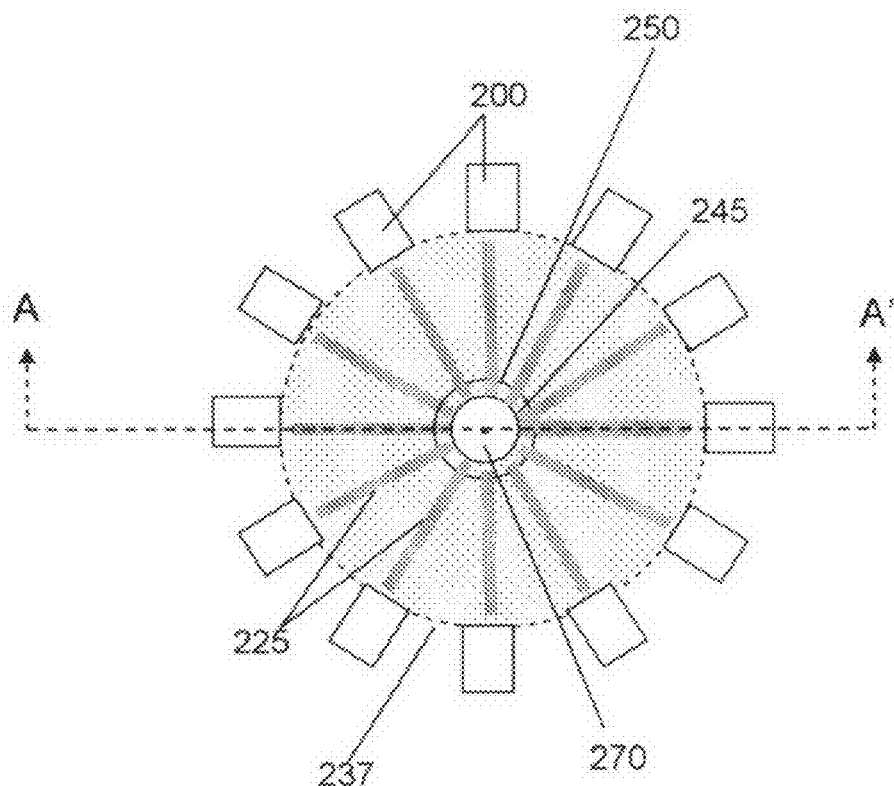
FIG. 4 is a top-view schematic representation where the light sources are arranged around the perimeter of a circle and the waveguides converge to the perimeter of a smaller circle where the light is reflected in order to be directed to the sample.
Figure 5:
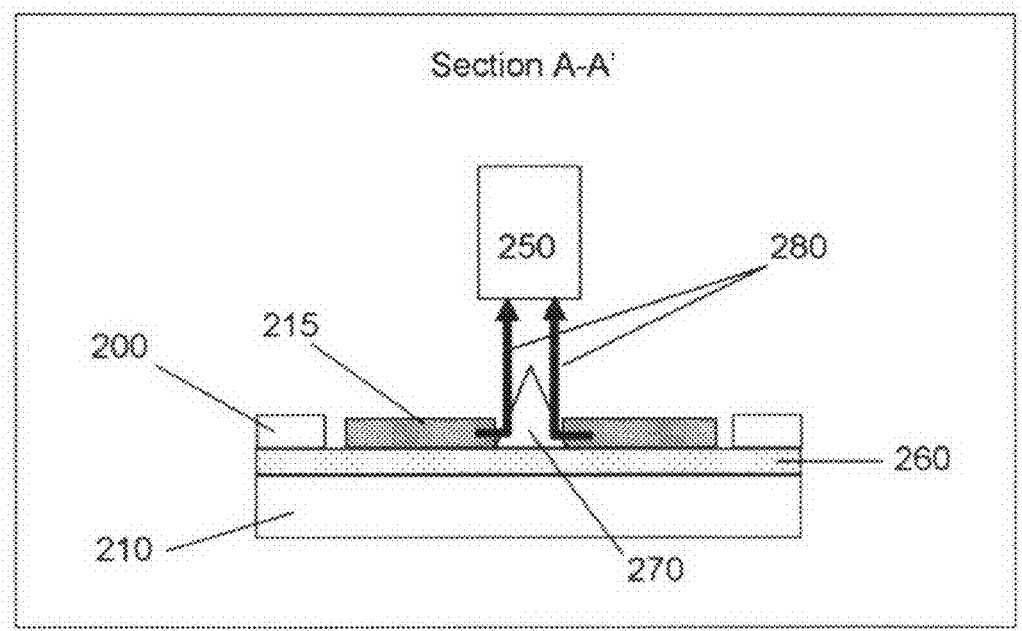
FIG. 5 is a small cross-sectional view of FIG. 4 showing the sub-carrier, cladding layer, semiconductor light source, waveguide core material, reflector, radiation and optical fiber.

FIGS. 4 and 5 show another preferred embodiment, in which the plurality of light sources 200 are arranged around the perimeter of a circle 237 having an input spatial span, given by the circumference of the circle. A waveguide array 225 fans in from the circle 237 to a circle 245, which has an output spatial span, given by its circumference, which is smaller than the input spatial span. A cone-shaped reflector 270 directs radiation 280 from the waveguide core 215 substantially out of a waveguide plane to the multimode optical fiber 250. In alternate preferred embodiments, this radiation could impinge directly on a sample without an optical fiber.

The embodiments of FIGS. 2-5 enable a large number of semiconductor light sources from diverse wafers, and over an arbitrarily large wavelength range, to be integrated into one multi-wavelength source having a reduced spatial extent. Typical numbers of sources are in the range 8-16 semiconductor light sources. The reduction in size is accomplished through use of a waveguide array co-integrated with the devices. The multi-wavelength source then typically emerges from a multi-mode optical fiber having a core diameter in the range of 50 microns to 2 mm.

Applications for this source are in spectroscopy of tissue, agricultural products, pharmaceuticals, and virtually any area of spectroscopy. A system for optical spectroscopy can then be constructed using the multi-wavelength source described herein, means for directing radiation from source to a sample under test (i.e tissue, agricultural sample, or pharmaceutical sample), and an optical detector configured to receive radiation reflected from or transmitted through the sample. Means for directing radiation to a sample is typically an optical fiber, but another preferred embodiment is direct illumination of a sample with no intervening optical components.

The wavelength range of the multi-wavelength source is limited only by the range of available semiconductor light source wavelengths. Some useful wavelength ranges are 650-1000 nm (tissue spectroscopy), 1100-2500 nm (near infrared spectroscopy), 700-1700 nm, (agricultural spectroscopy). These ranges and applications are only illustrative and not limiting. Many types of semiconductor light sources could be used, including blue Gallium Nitride lasers, Fabry-Perot lasers or quantum cascade mid-infrared and far-infrared lasers. In addition to semiconductor lasers, light emitting diodes (LEDs) and SLEDs (Superluminescent LEDs) can be used as light sources. In the preferred embodiment, a means for thermal tuning of the devices, such as a thermo-electric cooler or an integrated resistive heater can also be incorporated with the light sources 200 to increase wavelength coverage. Thus by electrically selecting one source and temperature at a time, the multi-wavelength source described herein functions as a widely tunable laser for spectroscopy.

The preferred waveguide core material 215 to form the waveguide array 220 or 225 is a spin on epoxy resin which can be lithographically patterned, in particular a commercially-available resin referred to as SU-8. The SU-8 material forms the core of the waveguide, while the silicon dioxide layer 260, which is a robust, well-established, and low optical loss thermally grown native oxide on silicon substrates, is the lower cladding layer, and the upper cladding layer is air. Alternate but not preferred waveguide core materials include deposited dielectric materials such as silicon nitride and titanium dioxide, and widely used spin-on materials like PMMA and PMGI. In an alternate preferred embodiment, the core layer is encapsulated by another lower refractive index spin-on glass layer, which keeps the waveguide immune to particulate contamination.

Figure 6:
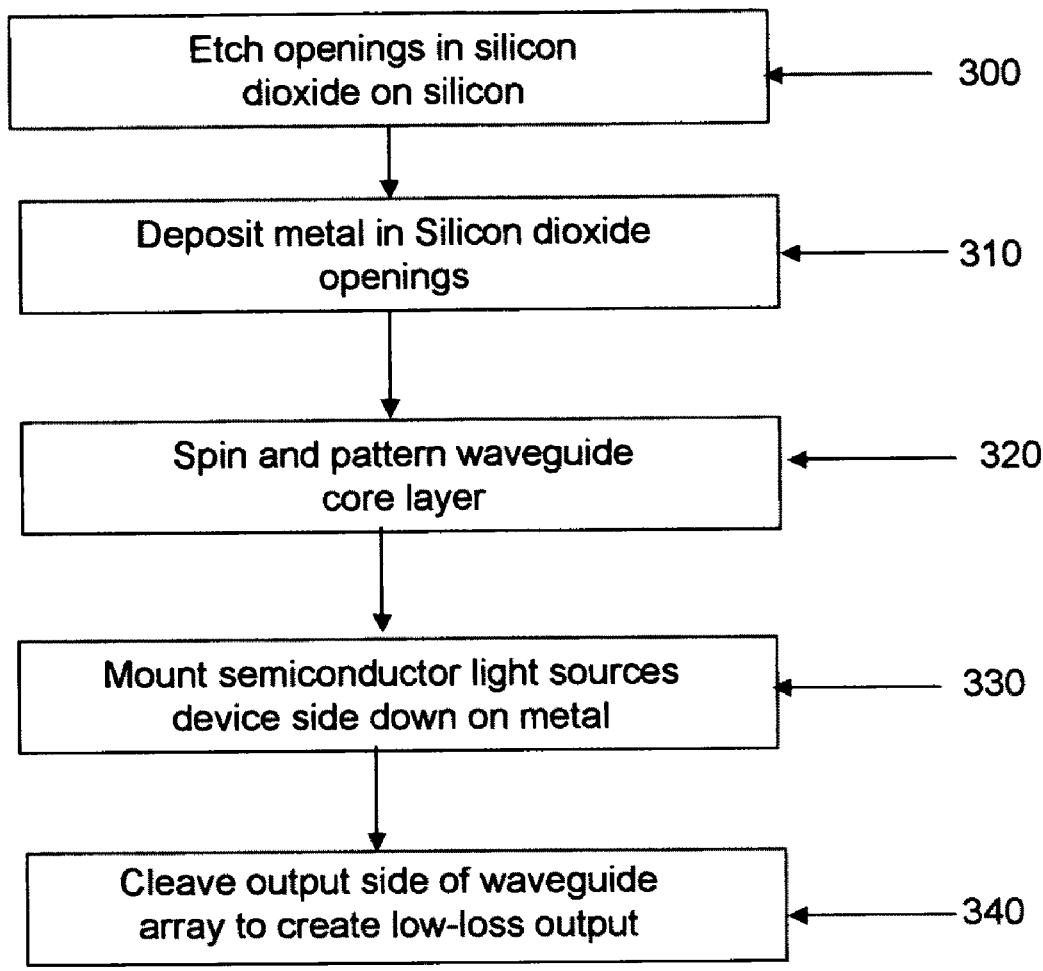
FIG. 6 is a flowchart that illustrates a fabrication method to create the waveguide array multi-wavelength light source.
Figure 7:
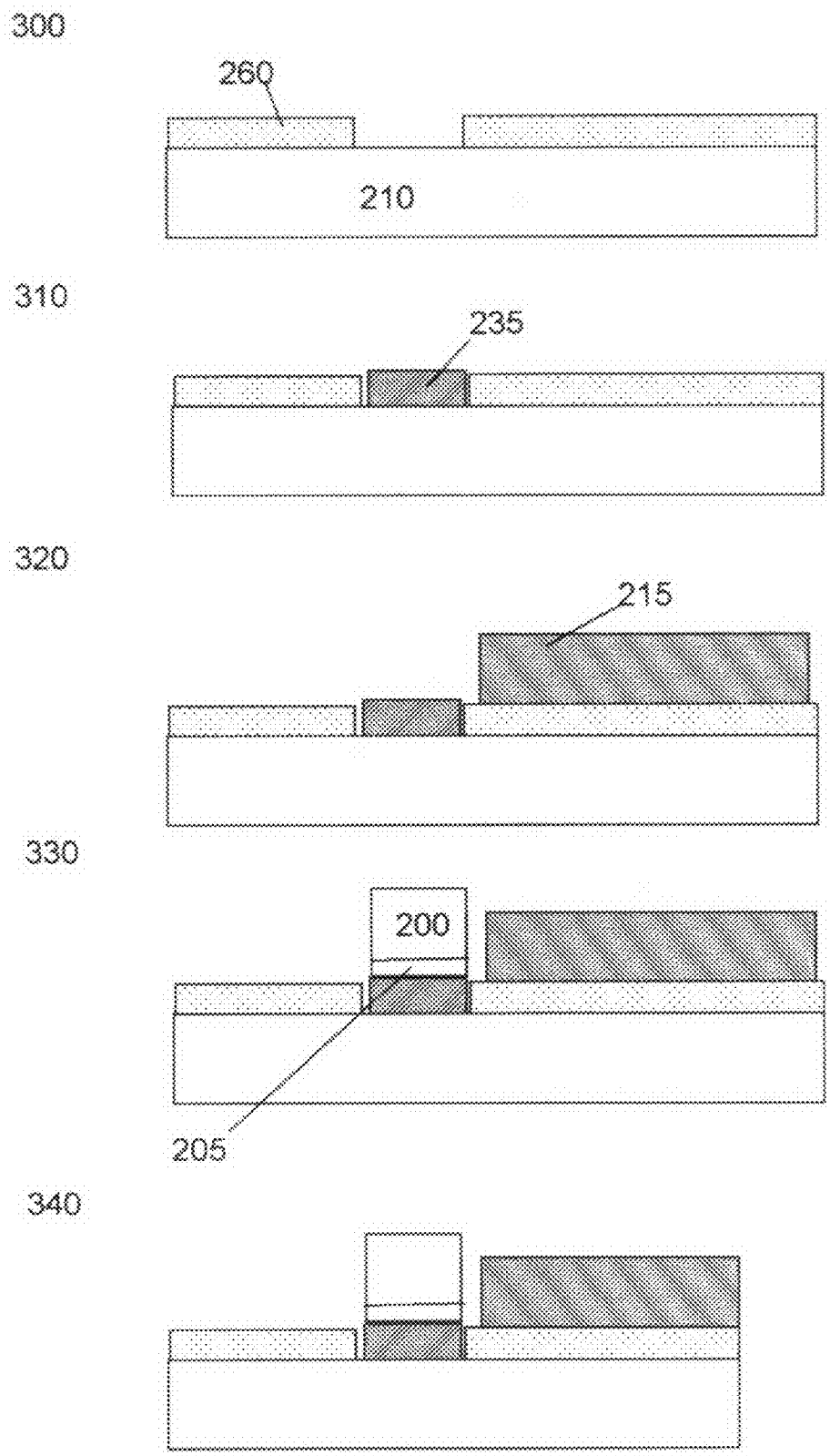
FIG. 7 shows a cross-sectional view for five fabrication steps associated with the method in the flowchart of FIG. 6, according to the present invention.

FIG. 7 illustrates through schematic cross-sectional views a preferred method for fabricating these devices, while FIG. 6 summarizes the steps in the form of a flow chart. In a first step 300, holes are etched in the native silicon dioxide layer 260 grown on silicon sub-carrier 210. In a second step 310, the metal interfacial layer 235 is deposited in these holes. In a third step 320, the waveguide core layer 215, which is preferably SU-8, is spun on the wafer and patterned. In a fourth step, individual semiconductor light sources 200 are mounted device side down on the interfacial metal layer 235. Although SU-8 is the preferred waveguide core layer material, other spin-on glasses could be used, as well as materials such as PMMA or PMGI. SU-8 is preferred because of its thickness range, its optical transmission, and the fact that it is photo-sensitive and can be directly patterned, without additional resists. In a final step 340, the device is cleaved at the output end to create a low-loss output for the emitted radiation.

While this invention has been particularly shown and described with references to the embodiments thereof, it will be understood by those skilled in the art that various changes in form and details may be made therein without departing from the spirit and scope of the invention as defined by the appended claims.

What is claimed is:

1. A system for optical spectroscopy, the system comprising:
a multi-wavelength light source emitting a plurality of radiation components spanning a wavelength range, means for directing said plurality of radiation components to a sample, and an optical detector configured to detect one of a radiation reflected from and a radiation transmitted through said sample,
Wherein said multi-wavelength light source comprises:
A plurality of semiconductor light sources disposed on a silicon sub-carrier, emitting said plurality of radiation components spanning said wavelength range, said radiation components coupled to an input side of a waveguide array having an input spatial span and output side with an output spatial span, said waveguide array disposed on said silicon subcarrier, and said waveguide array comprising a lower cladding of silicon dioxide and a deposited core layer having a core refractive index larger than a refractive index of said lower cladding.

2. The system source of claim 1, wherein said output spatial span is smaller than said input spatial span.

3. The multi-wavelength light source of claim 1, where said core layer is the commercially available epoxy resin SU-8.

4. The multi-wavelength light source of claim 1, wherein said plurality of semiconductor light sources are joined to said silicon sub-carrier by an interfacial metal layer.

5. The multi-wavelength light source of claim 1, wherein said core layer is defined by photo-lithography.

6. The multi-wavelength light source of claim 1, wherein said core layer is defined by mechanical stamping.

7. The multi-wavelength light source of claim 1, wherein said wavelength range is about 650-1000 nm.

8. The multi-wavelength light source of claim 1, wherein said wavelength range is about 700-1700 nm.

9. The multi-wavelength light source of claim 1, wherein the said plurality of semiconductor light sources are arranged in a linear formation.

10. The multi-wavelength light source of claim 1, wherein said input spatial span is about 6 mm.

11. The multi-wavelength light source of claim 1, wherein said output spatial span is about 300 microns.

12. The multi-wavelength light source of claim 1, wherein said plurality of semiconductor light sources comprises a number in a range of about eight to sixteen semiconductor light sources.

13. The multi-wavelength light source of claim 1, wherein the said plurality of semiconductor light sources are arranged in a circular formation.

14. The multi-wavelength light source of claim 1, further comprising means for temperature tuning of at least one of said plurality of semiconductor light sources.

15. The multi-wavelength light source of claim 1, wherein said plurality of semiconductor light sources comprises lasers.

16. The system of claim 1, wherein said plurality of semiconductor light sources comprises at least one of the group consisting of light-emitting diodes (LEDs) and superluminescent light emitting diodes (SLEDs).

17. The system of claim 1, wherein said means comprises a multi-mode optical fiber for receiving an output radiation from output side of said waveguide array and directing said output radiation to the sample.

18. The system of claim 17, wherein said multi-mode optical fiber has a core diameter in a range from about 50 microns to about 2 millimeters.

19. The system of claim 1, wherein said means comprises direct illumination of said sample with no intervening optical components.

20. The system of claim 1, wherein said sample is exactly one of the list consisting of in-vivo human tissue, an agricultural sample, and a pharmaceutical sample.

* * * * *